United States Patent [19]

McQueen

[11] Patent Number: 4,508,511

[45] Date of Patent: Apr. 2, 1985

[54] EDUCATIONAL BABY TOY WITH LIGHTS

[76] Inventor: Wayne F. McQueen, 110 E. Lauderdale St., Tullahoma, Tenn. 37388

[21] Appl. No.: 608,123

[22] Filed: May 8, 1984

[51] Int. Cl.³ .............................................. G09B 5/00
[52] U.S. Cl. ..................................... 434/258; 446/485
[58] Field of Search ...................... 434/258, 201, 205; 446/175, 485, 491

[56] References Cited

U.S. PATENT DOCUMENTS

| | | | |
|---|---|---|---|
| 3,654,710 | 4/1972 | Barnard | 434/258 |
| 3,707,783 | 1/1973 | Hajouk | 434/201 |
| 3,958,344 | 5/1976 | Lesiak | 434/205 X |
| 4,321,768 | 3/1982 | Engelhardt | 434/258 X |

*Primary Examiner*—William H. Grieb
*Attorney, Agent, or Firm*—Cushman, Darby & Cushman

[57] ABSTRACT

An educational baby toy in which a number of lamps of different colors are mounted on the upper surface of the housing in transverse rows and columns. Manually actuable buttons are likewise mounted on the upper surface with one button mounted adjacent each lamp for causing, when actuated, illumination of that lamp, one button mounted adjacent each row, column and diagonal thereof for causing, when actuated, sequential illumination of each lamp of that row, column or diagonal and three buttons for causing, when actuated, illumination of each of said lamps in two different given sequences and in a random sequence.

10 Claims, 4 Drawing Figures

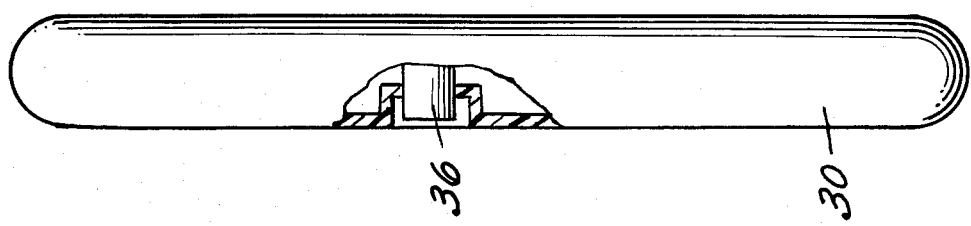
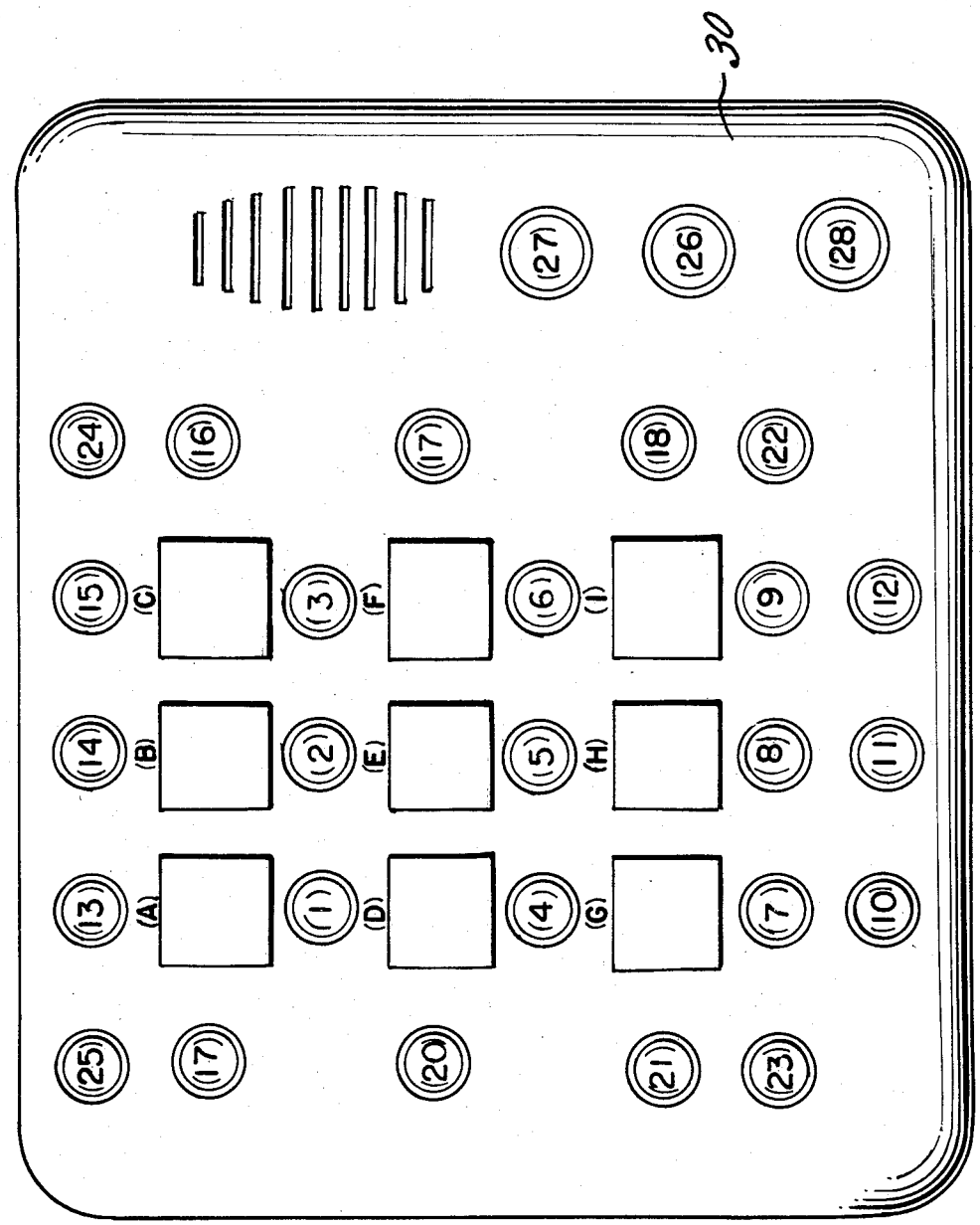

4,508,511

EDUCATIONAL BABY TOY WITH LIGHTS

BACKGROUND AND SUMMARY OF THE INVENTION

The invention relates to a unique educational baby toy.

The ability of young children under six years old to learn through interaction with properly designed toys is increasingly recognized. The normal toys for this age group have been busy-boxes, activity centers, play gyms, mobiles, musical toys, stuffed animals and the like. While of some educational benefits, such devices fail to fully engage the intellectual capacities of such children and likewise fail to take advantage of the possibilities provided by inexpensive computers which have found their way into a wide variety of various electronic toys designed for older children and adults.

The present invention relates to a unique educational baby toy provided with a plurality of different colored lights which are well known to be very attractive to young children and babies. The lights are mounted on the upper surface of a housing which also is provided with a number of different switches. Preferably, each of the lamps has associated with it an adjacent switch which, when actuated by the child, illuminates that lamp under the control of a relatively simple computer for a fixed period, for example, two seconds. The lamps are arranged in a given pattern, preferably a matrix of rows and columns with a button also associated with each row, column and diagonal of the rows and column. Actuation of any of these buttons by the child causes sequential illumination of each of the lamps of that row, column or diagonal for a fixed time period. Finally, additional buttons are provided for causing illumination of each of the lamps in a given or random sequence.

In this fashion, the child is not only encouraged to improve his motor skills by the actuation of the various switches but also to learn the association between actuation of the various switches and illumination of the lamps which follow. The series of lamps provide increasingly abstract association so that the child readily advances intellectually without the frustration of being unable to achieve anything interesting or desirable.

A simple computer is preferably mounted in the housing, together with a battery for providing energy to the system. In addition, a horn or the like is also provided and is preferably sounded each time a button is actuated. The lamps are preferably push-button types which are recessed flush with the surface of each of the lamps which are similarly recessed.

Other objects and purposes of the invention will be clear from the following detailed description of the drawings:

BRIEF DESCRIPTION OF THE DRAWINGS

FIG. 1 shows a front view of the toy of the present invention;

FIG. 2 shows a side view with a portion cut away showing a recessed button;

DETAILED DESCRIPTION OF THE DRAWINGS

Figure 3:
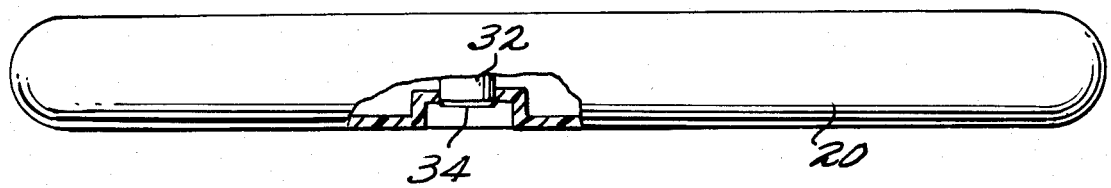
FIG. 3 shows a view of another side with a portion cut away showing a recessed lamp.
Figure 4:
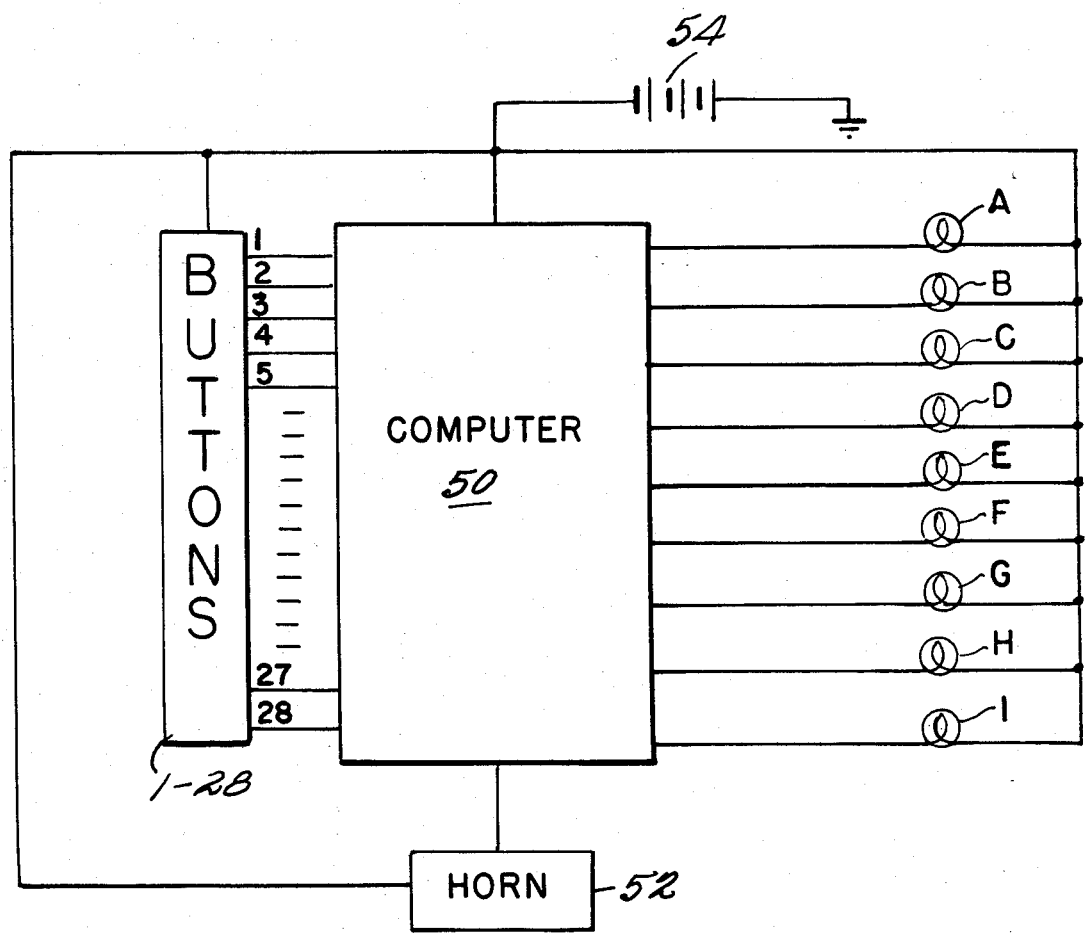
FIG. 4 shows a schematic view of the circuitry for controlling the lamps and buttons.

Reference is now made to FIGS. 1 through 3 which illustrate a first embodiment of the present invention. Nine conventional lights of different colors A-I are recessed in the upper surface of a housing 30. As can be seen best in FIG. 3, each of the lamps includes a simple bulb unit 32 covered by a different colored filter 34 to provide the desired hue. The lamps may be of any desired size and are arranged in a 3×3 matrix with transverse rows and columns.

Twenty-eight different buttons numbered 1 through 28 are disposed on the same surface of housing 30 and the buttons are individually recessed as button 36 shown in FIG. 2. One button is associated with each of the lamps directly below that lamp, namely, the buttons numbered 1 through 9 and actuation of any one of these buttons 1 through 9 causes the adjacent and associated colored lamp to be illuminated for a fixed time, for example, two seconds. Each of the rows, columns and diagonals thereof are similarly provided with associated buttons 10 through 23. Actuation of any of these buttons manually by a child results in sequential illumination of each of the lamps of that row, column or diagonal. Finally, three switches 26 through 28 are provided to permit the child to sequentially actuate each of the lamps A-I. One of the buttons causes each of the lamps to be illuminated randomly while the other two buttons cause the lamps to be illuminated in a given but different sequence. The following chart indicates the lamps which are illuminated for each of the twenty-eight buttons.

1. Push 1 and lamp A lights and stays on for approx. 2 secs.
2. Push 2 and B lights and stays on for approx 2 secs.
3. Push 3 and C lights and stays on for approx 2 secs.
4. Push 4 and D lights and stays on for approx 2 secs.
5. Push 5 and E lights and stays on for approx 2 secs.
6. Push 6 and F lights and stays on for approx 2 secs.
7. Push 7 and G lights and stays on for approx 2 secs.
8. Push 8 and H lights and stays on for approx 2 secs.
9. Push 9 and I lights and stays on for approx 2 secs.
10. Push 10 and G, D, A light and strobe at 2 secs each in sequence.
11. Push 11 and H, E, B light and strobe at 2 secs each in sequence.
12. Push 12 and I, F, C light and strobe at 2 secs each in sequence.
13. Push 13 and A, D, G light and strobe at 2 secs each in sequence.
14. Push 14 and B, E, G light and strobe at 2 secs each in sequence.
15. Push 15 and C, F, I light and strobe at 2 secs each in sequence.
16. Push 16 and C, B, A light and strobe at 2 secs each in sequence.
17. Push 17 and F, E, D light and strobe at 2 secs each in sequence.
18. Push 18 and I, H, G light and strobe at 2 secs each in sequence.
19. Push 19 and A, B, C light and strobe at 2 secs each in sequence.
20. Push 20 and D, E, F light strobe at 2 secs each in sequence.
21. Push 21 and G, H, I light and strobe at 2 secs each in sequence.

22. Push 22 and I, E, A light and strobe at 2 secs each in sequence.
23. Push 23 and G, E, C light and strobe at 2 secs each in sequence.
24. Push 24 and C, E, G light and strobe at 2 secs each in sequence.
25. Push 25 and A, E, I light and strobe at 2 secs each in sequence.
26. Push 26 and I, H, G, D, E, F, C, B, A light and strobe at 2 secs each in sequence.
27. Push 27 and A, B, C, D, E, F, G, H, I light and strobe at 2 secs each in sequence.
28. Push 28 and all lights come on in a random sequence.

Reference is now made to FIG. 3 which indicates schematically computer 50 which responds to actuation of a given button by causing illumination of one or more of the lamps as described above. The computer 50 also causes operation of the horn 52 to cause a sound each time one of the buttons is actuated. Battery 54 mounted within housing 30 to provide electrical energy for the system.

Manu changes and modifications of the above-described embodiment of the invention can, of course, be carried out without departing from the scope thereof. Accordingly, that scope is intended to be limited only by the scope of the appended claims.

What is claimed is:

1. An elongated baby toy comprising:
   a housing;
   a plurality of different colored lamps arranged in a pattern of transverse columns and rows mounted on an upper surface of said housing;
   a plurality of manually actuable buttons in number greater than the number of said lamps and mounted on said upper surface, each of said lamps being associated with an adjacent button which, when actuated, causes illumination for a fixed time of the adjacent lamp and each of said rows and columns and each of the diagonals of said rows and columns being associated with an adjacent button which, when actuated, causes illumination for a fixed time of each of the lights of that row, column or diagonal sequentially;
   means for supplying electrical energy to illuminate said lamps; and
   computer means within said housing for controlling illumination of said lamps in response to manual button actuation.

2. A toy as in claim 1 further including means for producing a sound in response to actuation of at least some of said buttons.

3. A toy as in claim 1 wherein said buttons are recessed to be flush with the surface of said housing in an unactuated position.

4. A toy as in claim 1 wherein said lights are recessed from said surface of said housing.

5. A toy as in claim 1 wherein said lights are arranged in a pattern of three transverse columns and rows.

6. A toy as in claim 5 wherein the number of lights is nine.

7. A toy as in claim 5 wherein said buttons include at least two buttons which, when actuated, respectively cause illumination of each of said lamps in a given sequence and in a random sequence.

8. A toy as in claim 7 wherein two buttons, when actuated, each respectively illuminate each of said lamps in a different but given sequence.

9. A toy as in claim 1 wherein said supplying means is a battery.

10. An educational baby toy comprising:
    a housing;
    a plurality of different colored lamps mounted on an upper surface of said housing in a pattern of transversly extending columns and rows;
    means for supplying electrical energy to said lamps for respective illumination thereof;
    a plurality of manually actuable buttons greater in number than the number of lamps, one button being disposed adjacent each lamp for causing, when actuated, illumination of the associated lamp for a fixed time, one button each disposed adjacent each row and column and each diagonal of the rows and columns for causing, when actuated, illumination of each of the lamps of that row, column or diagonal in sequence and two buttons for respectively each causing, when actuated, illumination of each of said lamps in a given sequence and in a random sequence; and
    computer means connected to said buttons and lamps for controlling the illumination of said lamps in response to manual button actuation.

* * * * *